United States Patent
Yamane et al.

(10) Patent No.: US 11,840,053 B2
(45) Date of Patent: Dec. 12, 2023

(54) SKIN MATERIAL AND METHOD FOR PRODUCING THE SAME

(71) Applicant: TOYOTA BOSHOKU KABUSHIKI KAISHA, Aichi (JP)

(72) Inventors: Ryo Yamane, Aichi (JP); Yoshiaki Tomasu, Aichi (JP)

(73) Assignee: TOYOTA BOSHOKU KABUSHIKI KAISHA, Aichi (JP)

(*) Notice: Subject to any disclaimer, the term of this patent is extended or adjusted under 35 U.S.C. 154(b) by 0 days.

(21) Appl. No.: 17/965,435

(22) Filed: Oct. 13, 2022

(65) Prior Publication Data

US 2023/0034721 A1  Feb. 2, 2023

Related U.S. Application Data

(62) Division of application No. 16/837,279, filed on Apr. 1, 2020, now abandoned.

(30) Foreign Application Priority Data

Apr. 17, 2019 (JP) .................. 2019-078904

(51) Int. Cl.
  *B29C 59/02*   (2006.01)
  *B32B 38/00*   (2006.01)
  *B32B 5/02*    (2006.01)
  *B32B 3/30*    (2006.01)
  (Continued)

(52) U.S. Cl.
  CPC ............ *B32B 38/004* (2013.01); *B32B 3/266* (2013.01); *B32B 3/30* (2013.01); *B32B 5/026* (2013.01); *D06C 23/04* (2013.01); *Y10T 428/2457* (2015.01); *Y10T 428/24521* (2015.01);
  (Continued)

(58) Field of Classification Search
  None
  See application file for complete search history.

(56) References Cited

U.S. PATENT DOCUMENTS 122,569 A * 1/1872 Chute ............... B29C 59/02
                                                    264/293
2,019,641 A * 11/1935 Zinser ............... B60R 13/02
                                                    428/167

(Continued)

FOREIGN PATENT DOCUMENTS

CN   103118856   5/2013
CN   106922139   7/2017
(Continued)

OTHER PUBLICATIONS

China Office Action issued in China Patent Application No. 202010235393.X, dated Jul. 5, 2022, along with an English translation thereof.

(Continued)

*Primary Examiner* — Jeffrey A Vonch
(74) *Attorney, Agent, or Firm* — Greenblum & Bernstein, P.L.C.

(57) ABSTRACT

The method for producing a skin material is a method for producing a skin material having a concave part formed on the front surface side, comprising heat-pressing a raw material between an embossing die and an elastic sheet to form the concave part and, at the same time, forming a convex part on a bottom surface of the concave part.

21 Claims, 8 Drawing Sheets

(51) Int. Cl.
 *B32B 3/26* (2006.01)
 *D06C 23/04* (2006.01)
(52) U.S. Cl.
 CPC ............ *Y10T 428/24537* (2015.01); *Y10T 428/24612* (2015.01); *Y10T 442/40* (2015.04)

(56) References Cited

U.S. PATENT DOCUMENTS

| | | | | |
|---|---|---|---|---|
| 2,206,078 A * | 7/1940 | Cunnington | ............ | B60N 3/02 156/219 |
| 2,282,170 A * | 5/1942 | Cunnington | ............ | B60R 13/02 428/182 |
| 2,303,195 A * | 11/1942 | Buff | ............ | B60R 13/02 428/196 |
| 2,303,198 A * | 11/1942 | Cunnington | ............ | D06C 23/00 156/581 |
| 2,311,068 A | 2/1943 | Millar | | |
| 2,322,226 A * | 6/1943 | Cunnington | ............ | B44C 1/24 428/167 |
| 2,338,490 A * | 1/1944 | Cunnington | ............ | B29C 44/16 156/220 |
| 2,341,978 A * | 2/1944 | Cunnington | ............ | B44C 1/24 156/219 |
| 2,341,979 A * | 2/1944 | Cunnington | ............ | B29C 44/10 264/46.7 |
| 2,434,527 A * | 1/1948 | Untiedt | ............ | B29C 35/02 156/220 |
| 2,500,895 A * | 3/1950 | Davies | ............ | B60R 13/0243 156/530 |
| 2,550,455 A * | 4/1951 | Davies | ............ | B60R 13/0243 428/128 |
| 2,586,208 A * | 2/1952 | Corallo | ............ | B44F 11/00 156/291 |
| 2,699,416 A * | 1/1955 | Lyijynen | ............ | B60R 13/02 156/92 |
| 2,914,109 A * | 11/1959 | Hsu | ............ | B29C 59/026 264/293 |
| 2,946,713 A * | 7/1960 | Dusina, Jr. | ............ | B29C 66/45 264/491 |
| 2,962,406 A * | 11/1960 | Rosa | ............ | B29C 44/1209 428/921 |
| 3,094,716 A * | 6/1963 | Friedman | ............ | A47C 27/22 29/91.1 |
| 3,471,354 A * | 10/1969 | Scofield | ............ | B32B 27/00 118/44 |
| 3,652,359 A * | 3/1972 | Decker | ............ | B32B 7/12 156/224 |
| 3,705,071 A * | 12/1972 | Gras | ............ | B29C 66/1122 156/219 |
| 4,076,789 A | 2/1978 | Geller et al. | | |
| 4,211,743 A * | 7/1980 | Nauta | ............ | B29C 59/022 425/363 |
| 4,519,862 A | 5/1985 | Urai et al. | | |
| 4,561,917 A * | 12/1985 | Urai | ............ | B29C 65/08 156/290 |
| 4,563,785 A * | 1/1986 | Samelson | ............ | A47G 9/10 112/475.08 |
| 4,627,660 A | 12/1986 | Kon | | |
| 4,627,664 A * | 12/1986 | Okazaki | ............ | B29D 99/0092 297/452.61 |
| 4,698,253 A * | 10/1987 | Osawa | ............ | B60N 2/70 428/167 |
| 4,781,710 A * | 11/1988 | Megison | ............ | A61F 13/47 604/385.101 |
| 4,867,826 A * | 9/1989 | Wayte | ............ | B32B 7/12 156/219 |
| 5,591,289 A * | 1/1997 | Souders | ............ | B29C 70/345 156/308.2 |
| 5,714,179 A * | 2/1998 | Goodridge | ............ | B29C 70/44 425/DIG. 44 |
| 6,231,940 B1 * | 5/2001 | Aichner | ............ | B60K 37/00 428/36.2 |
| 6,755,052 B1 * | 6/2004 | Sytz | ............ | D04B 1/18 66/196 |
| 10,766,184 B2 | 9/2020 | Kitano et al. | | |
| 11,267,190 B2 * | 3/2022 | Yamane | ............ | B29C 33/405 |
| 2004/0097151 A1 * | 5/2004 | McMurray | ............ | D04B 1/126 442/306 |
| 2004/0137103 A1 * | 7/2004 | Lin | ............ | B29C 59/02 425/385 |
| 2007/0296118 A1 * | 12/2007 | Kuwahaha | ............ | B27N 3/20 428/156 |
| 2010/0230858 A1 * | 9/2010 | Stone | ............ | B29C 66/81433 264/293 |
| 2011/0247370 A1 * | 10/2011 | Akao | ............ | D04B 1/16 66/196 |
| 2013/0068376 A1 * | 3/2013 | Kuwahara | ............ | B29C 66/4724 156/219 |
| 2013/0316141 A1 * | 11/2013 | Kammerer | ............ | B32B 27/065 156/247 |
| 2017/0334127 A1 | 11/2017 | Kitano et al. | | |
| 2018/0187348 A1 * | 7/2018 | Mueller | ............ | B32B 5/026 |
| 2019/0039346 A1 * | 2/2019 | Yoshimura | ............ | B32B 5/026 |
| 2019/0084265 A1 * | 3/2019 | Or | ............ | B31F 1/10 |
| 2019/0118505 A1 | 4/2019 | Shirasaki | | |
| 2019/0322072 A1 | 10/2019 | Yoshikawa | | |
| 2019/0381955 A1 * | 12/2019 | Mueller | ............ | D04B 21/16 |
| 2020/0039137 A1 | 2/2020 | Yamane et al. | | |
| 2020/0282884 A1 * | 9/2020 | Nakajima | ............ | B32B 3/30 |
| 2020/0316846 A1 * | 10/2020 | Nakajima | ............ | B29C 59/022 |
| 2021/0162705 A1 * | 6/2021 | Ishiyama | ............ | B32B 5/024 |

FOREIGN PATENT DOCUMENTS

| | | | | |
|---|---|---|---|---|
| DE | 4206494 | | 9/1993 | |
| DE | 102009012623 A1 * | | 9/2010 | ........ B60N 2/5866 |
| EP | 0185626 | | 6/1986 | |
| EP | 185626 A2 * | | 6/1986 | ........ B32B 3/02 |
| EP | 354737 A1 * | | 2/1990 | ........ A47C 27/146 |
| FR | 2614577 A1 * | | 11/1988 | ........ B44B 5/008 |
| FR | 3045525 A1 * | | 6/2017 | |
| GB | 2011980 | | 8/1984 | |
| GB | 2299053 A * | | 9/1996 | ........ B32B 27/12 |
| JP | 55-121018 | | 9/1980 | |
| JP | 57-25942 | | 2/1982 | |
| JP | 57187243 A * | | 11/1982 | |
| JP | 59041230 A * | | 3/1984 | ........ B29C 59/026 |
| JP | 59071835 A * | | 4/1984 | |
| JP | 59089248 A * | | 5/1984 | |
| JP | 59-174185 | | 10/1984 | |
| JP | 60032631 A * | | 2/1985 | ........ B29C 59/02 |
| JP | 62130824 A | | 6/1987 | |
| JP | 63114625 A * | | 5/1988 | ........ B29C 51/08 |
| JP | 05254024 A * | | 10/1993 | |
| JP | 9-48071 | | 2/1997 | |
| JP | 10315326 A * | | 12/1998 | |
| JP | 2002371421 A * | | 12/2002 | |
| JP | 2003-204993 | | 7/2003 | |
| JP | 2003200487 A * | | 7/2003 | |
| JP | 2003326598 A * | | 11/2003 | |
| JP | 2005125845 A * | | 5/2005 | |
| JP | 2007-180315 | | 7/2007 | |
| JP | 2007276285 A * | | 10/2007 | |
| JP | 2007331222 A * | | 12/2007 | |
| JP | 2008049835 A * | | 3/2008 | |
| JP | 2010248645 A * | | 11/2010 | |
| JP | 2012045768 A * | | 3/2012 | |
| JP | 2012210776 A * | | 11/2012 | |
| JP | 2013-059881 | | 4/2013 | |
| JP | 2013-223874 | | 10/2013 | |
| JP | 2015112741 A * | | 6/2015 | |
| JP | 2016147432 A * | | 8/2016 | |
| JP | 2016-203639 | | 12/2016 | |
| JP | 2017-113937 | | 6/2017 | |
| JP | 2017113937 A * | | 6/2017 | |
| JP | 2017-213865 | | 12/2017 | |
| JP | 2018-171886 | | 11/2018 | |
| JP | 2018199264 A * | | 12/2018 | |
| KR | 2011001360 U * | | 2/2011 | |
| KR | 1619795 B1 * | | 5/2016 | |

(56) References Cited

FOREIGN PATENT DOCUMENTS

| KR | 1629145 B1 * | 6/2016 | ............ A47C 31/11 |
|---|---|---|---|
| KR | 10-2017-122396 | 11/2017 | |
| KR | 10-1805356 | 12/2017 | |
| KR | 10-1881492 | 8/2018 | |
| KR | 2018104552 A * | 9/2018 | ............ B32B 27/12 |
| KR | 2019000230 A * | 1/2019 | ............ B32B 27/12 |
| RU | 177868 U1 * | 3/2018 | |
| WO | WO-2016006399 A1 * | 1/2016 | ............ B29C 51/12 |
| WO | 2016/079816 | 5/2016 | |
| WO | 2019/065547 | 4/2019 | |
| WO | WO-2020136816 A1 * | 7/2020 | |

OTHER PUBLICATIONS

Japan Office Action issued in Japan Patent Application No. 2019-078904, dated Nov. 8, 2022, along with an English machine translation thereof.

China Office Action issued in China Patent Application No. 202010235393.X, dated Jan. 28, 2023, together with English translation thereof.

China Office Action received in CN Application No. 202010235393.X, dated Jun. 2, 2023.

* cited by examiner

SKIN MATERIAL AND METHOD FOR PRODUCING THE SAME

CROSS REFERENCE TO RELATED APPLICATIONS

The present application is a divisional of U.S. patent application Ser. No. 16/837,279, filed Apr. 1, 2020, and claims priority under 35 U.S.C. § 119 of Japanese Patent Application No. 2019-078904, filed Apr. 17, 2019. The contents of each of these applications are incorporated herein by reference in their entirety.

BACKGROUND OF THE INVENTION

(1) Field of the Invention

The present invention relates to a skin material and a method for producing the same, and more particularly, to a skin material having a concave part formed on the front surface side and a method for producing the same.

(2) Description of Related Art

As a conventional method for producing a skin material, there is generally known a production method involving the use of an embossing die to obtain a skin material having a concave part on the front surface side (see, for example, JP 2017-213865 A). JP 2017-213865 A describes that the concave part is formed by heat-pressing a raw material between the embossing die and a metal pedestal.

However, since the concave part is formed by heat-pressing the raw material between the embossing die and the metal pedestal in the technique described in JP 2017-213865 A, an elongated line- or dotted line-shaped convex part or small dot-shaped convex parts cannot be clearly expressed on the bottom surface of the concave part. Therefore, the degree of freedom in design expression in the skin material cannot be increased.

Although JP 2017-113937 A describes a production method comprising heat-pressing a sheet raw material 2 between an embossing plate 41 and a cushion material 45 to obtain a sheet fabric 1. This cushion material 45 is used to bite the sheet raw material 2 into a concave part 41" of the embossing plate 41 for the purpose of sharpening the corner of a convex pattern 3 of the sheet fabric 1 (see, for example, paragraph [0012] and FIG. 3). JP 2017-113937 A nowhere discloses expressing an elongated line- or dotted line-shaped convex part or small dot-shaped convex parts on the bottom surface of a concave pattern 3'.

SUMMARY OF THE INVENTION

An embodiment of the present invention has been made in view of the above circumstances, and an object thereof is to provide a skin material capable of increasing the degree of freedom in design expression and a method for producing the same.

One aspect of the present embodiments provides a method for producing a skin material having a concave part formed on a front surface side, comprising: heat-pressing a raw material between an embossing die and an elastic sheet to form the concave part and; at the same time, forming a convex part on a bottom surface of the concave part.

In a further aspect, a pressing rib may be protrudingly provided on a surface of the embossing die, the pressing rib may be formed with a gap part that opens at its tip end surface, and, during the heat-pressing, the pressing rib may press the front surface side of a part of the raw material to form the concave part, and, at the same time, a part of the raw material may be pushed out into the gap part by repulsive force of the elastic sheet due to the pressing of the pressing rib to form the convex part.

In a further aspect, the heat-pressing may be performed in a state where the surface of the embossing die on which the pressing rib is protrudingly provided is spaced apart from the front surface of the raw material.

One aspect of the present embodiments provides a skin material having a concave part formed on a front surface side, wherein a convex part is formed on the bottom surface of the concave part.

In a further aspect, the convex part may be formed to extend linearly in a plan view or a plurality of the convex parts may be formed to be arranged in a line in a plan view.

In a further aspect, the concave part may be formed to extend linearly in a plan view.

In a further aspect, a width of the convex part may be 0.3 to 10 mm.

In a further aspect, the skin material may include a base cloth layer containing at least thermoplastic resin fibers and made of a knit, and a skin layer bonded to a surface of the base cloth layer, in the base cloth layer, a concave heat-deformed part in which the thermoplastic resin fibers are thermally deformed may be formed at a position corresponding to the concave part, the heat-deformed part may include a bulging part at a position corresponding to the convex part, and the skin layer may follow a surface shape of the heat-deformed part.

According to the method for producing a skin material according to the present embodiment, a raw material is heat-pressed between an embossing die and an elastic sheet to form a concave part, and, at the same time, a convex part is formed on the bottom surface of the concave part. Thus, an elongated line- or dotted line-shaped convex part or small dot-shaped convex parts is/are clearly expressed on the bottom surface of the concave part. Therefore, the degree of freedom of design expression in the skin material can be increased.

When a pressing rib is protrudingly provided on a surface of the embossing die; the pressing rib is formed with a gap part; and, during the heat-pressing, the pressing rib presses the front surface side of a part of the raw material to form the concave part, and, at the same time, a part of the raw material is pushed out into the gap part by repulsive force of the elastic sheet due to the pressing of the pressing rib to form the convex part, an elongated line- or dotted line-shaped convex part or small dot-shaped convex parts is/are more clearly expressed.

Furthermore, when the heat-pressing is performed in a state where the surface of the embossing die on which the pressing rib is protrudingly provided is spaced apart from the front surface of the raw material, thermal deterioration of the front surface of the skin material is suppressed.

In the skin material of the present embodiment, the convex part is formed on the bottom surface of the concave part. Thus, an elongated line- or dotted line-shaped convex part or small dot-shaped convex parts is/are clearly expressed on the bottom surface of the concave part. Therefore, the degree of freedom of design expression in the skin material can be increased.

When the convex part is formed to extend linearly in a plan view or a plurality of the convex parts are formed to be arranged in a line, an elongated line- or dotted line-shaped convex part is clearly expressed.

When the concave part is formed to extend linearly in a plan view, an elongated line- or dotted line-shaped convex part is clearly expressed along the bottom surface of the linear concave part.

Further, when a width of the convex part is 0.3 to 10 mm, a more elongated line- or dotted line-shaped convex part or smaller dot-shaped convex parts is/are clearly expressed.

Further, when the skin material includes a base cloth layer and a skin layer; in the base cloth layer, a concave heat-deformed part in which the thermoplastic resin fibers are thermally deformed is formed at a position corresponding to the concave part; the heat-deformed part includes a bulging part at a position corresponding to the convex part; and the skin layer follows the surface shape of the heat-deformed part, an elongated line- or dotted line-shaped convex part or small dot-shaped convex parts can be more clearly expressed, and the skin material can have appropriate cushioning properties.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 5A and 5B are explanatory views for explaining a method for producing the skin material, in which FIG. 5A shows a die open state (raw material setting state) before embossing, and FIG. 5B shows a die close state during embossing;

FIGS. 11A and 11B are explanatory views for explaining skin materials according to still other forms, in which FIG. 11A shows a curved convex part, FIG. 11B shows a plurality of convex parts arranged in a curve, FIG. 11C shows a plurality of convex parts that intersect, and FIG. 11D shows a convex part having a width different in the longitudinal direction.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Skin Material

Figure 1:
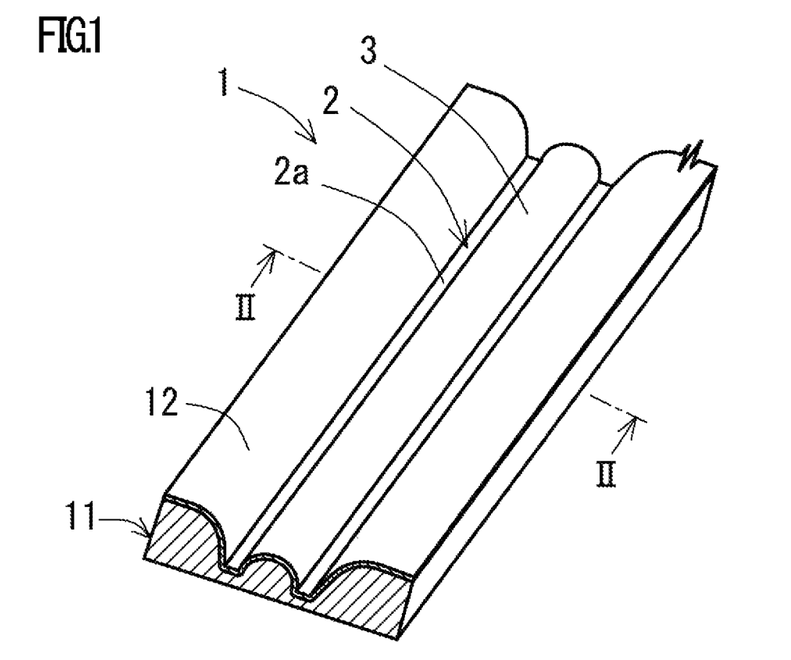
FIG. 1 is a perspective view of a skin material according to Example 1.
Figure 8:
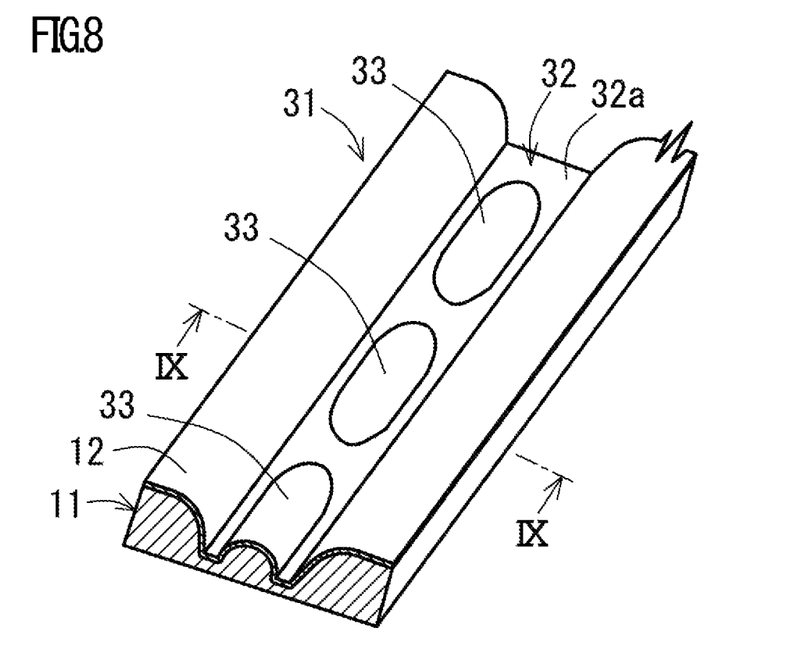
FIG. 8 is a perspective view of a skin material according to Example 2.

A skin material according to the present embodiment is a skin material (1, 31) having a concave part (2, 32) formed on the front surface side, wherein a convex part (3, 33, 43) is formed on a bottom surface (2a, 32a) of the concave part, for example, as shown in FIGS. 1 and 8.

Figure 11D:
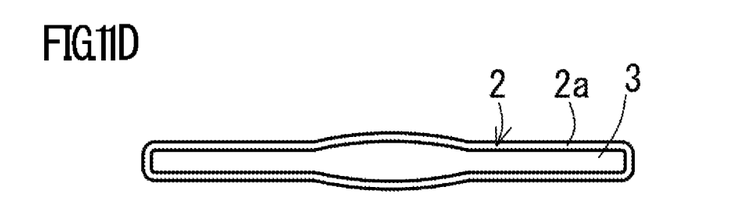
Figure 12:
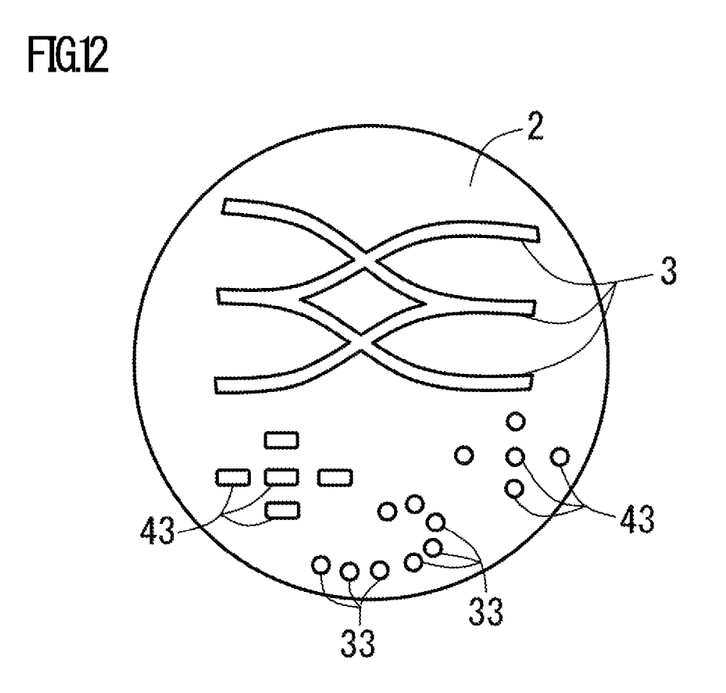
FIG. 12 is an explanatory view for explaining a skin material according to still another form.

The shape, placement, number and the like of the concave part (2, 32) are not particularly limited. The depth (d) of the concave part is, for example, 0.5 to 20 mm (preferably 1 to 10 mm) (for example, see FIG. 2). Further, the concave part can be formed, for example, to extend linearly in a plan view. In this case, the width (w2) of the concave part in the short length direction is, for example, 1 to 20 mm (preferably 1 to 10 mm). The width (w2) of the concave part in the short length direction may be uniform along the long length direction thereof, or may be different in the long length direction thereof (for example, see FIG. 11D). In addition, for example, as shown in FIG. 12, the concave part can be formed to expand in a planar shape in a plan view. Furthermore, the bottom surface (2a, 32a) of the concave part may be, for example, formed as a plane parallel to the bottom surface of the skin material (1, 31) or formed as a tapered surface inclined with respect to the bottom surface of the skin material.

The shape, size, placement, number and the like of the convex part (3, 33, 43) are not particularly limited. The convex part usually has a height (h) smaller than the depth (d) of the concave part (2, 32) (for example, see FIG. 2). In addition, the convex part is usually formed in a mountain shape (i.e., a bulging shape) in a vertical cross section. The width (w1) of the convex part is, for example, 0.3 to 10 mm (preferably 0.5 to 5 mm, particularly 3 mm or less, more preferably 2 mm or less). The height (h) of the convex part is, for example, 0.1 to 10 mm (preferably 0.1 to 5 mm). Further, from the viewpoint of the visibility (clarity) of the convex part, the ratio (h/w1) of the height (h) to the width (w1) of the convex part is preferably 0.1 to 2 (particularly 0.2 to 1).

The convex part (3) can be formed to extend linearly in a plan view, for example, as shown in FIG. 1. In this case, the width (w1) of the convex part in the short length direction may be uniform along the long length direction thereof or may be different in the long length direction thereof (for example, see FIG. 11D). In addition, for example, as shown in FIG. 8, a plurality of the convex parts (33) can be formed to be arranged in a line in a plan view. In this case, the respective convex parts may have the same shape and size, or may have different shapes and sizes. Further, for example, as shown in FIG. 12, the convex parts (43) can be formed in a dot shape in a plan view. In this case, for example, the plurality of convex parts can be arranged at random or according to a predetermined rule.

Figure 2:
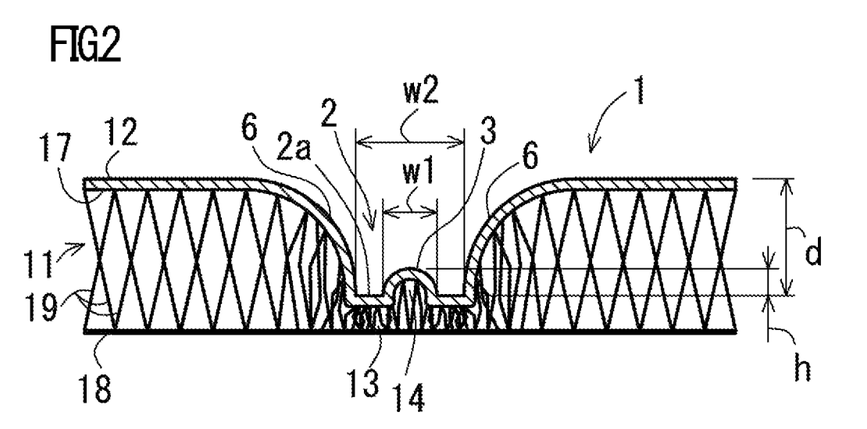
FIG. 2 is an enlarged cross-sectional view taken along line II-II of FIG. 1.

The configuration, material, size and the like of the skin material (1, 31) are not particularly limited. This skin material can include a base cloth layer (11) containing at least thermoplastic resin fibers and made of a knit, and a skin layer (12) bonded to a surface of the base cloth layer, for example, as shown in FIG. 2. In this case, for example, in the base cloth layer (11), a concave heat-deformed part (13) in which the thermoplastic resin fibers are thermally deformed is formed at a position corresponding to the concave part (2, 32), and the heat-deformed part includes a bulging part (14) at a position corresponding to the convex part (3, 33, 43). The skin layer (12) can follow the surface shape of the heat-deformed part (13).

Examples of the knit include a three-dimensional knitted fabric, a jersey, and a tricot. Among these, in terms of bulkiness, a three-dimensional knitted fabric is preferable. This three-dimensional knitted fabric can be knitted by, for example, a knitting machine such as a double raschel knitting machine or a circular knitting machine. Also, the three-dimensional knitted fabric can be formed in such a manner that a front side knitted fabric (17) and a back side knitted fabric (18) are connected by a binding yarn (19), for example, as shown in FIG. 2. In this case, for example, at least thermoplastic resin fibers are used for the binding yarn (19). In the concave heat-deformed part (13), the binding yarn can fall down so that thickness of the base cloth layer (11) may become small.

Examples of constituent yarns for the knitted fabric (17, 18) include yarns made of one or a combination of two or more of synthetic fibers, regenerated fibers, natural fibers and the like. Further, a filament yarn is usually used as the binding yarn (19). This filament yarn may be either a multifilament or a monofilament, and may be subjected to known texturing, for example, false twisting. The type of the fibers constituting the filament yarn is not particularly limited, and the fibers may be any of synthetic fibers, recycled fibers, natural fibers, and the like.

The thickness of the base cloth layer (11) is not particularly limited, and can be set to, for example 1 to 20 mm, particularly 2 to 10 mm. If this thickness is within the above range, sufficient cushioning properties can be obtained, and three-dimensional shaping can be performed sufficiently.

The skin layer (12) is usually bonded to one side of the base cloth layer by adhesion, heat welding or the like. As the skin layer, known skin materials such as a design cloth (fabric), a resin layer (PU, PVC, PP, etc.), synthetic leather, artificial leather, and natural leather are used. The skin layer may be a single layer or a layer in which a plurality of layers are laminated. The thickness of the skin layer is not particularly limited, and can be set to, for example 0.01 to 10 mm, especially 0.1 to 5 mm. If this thickness is within the above range, the skin layer can favorably follow the surface shape of the base cloth layer.

Figure 4:
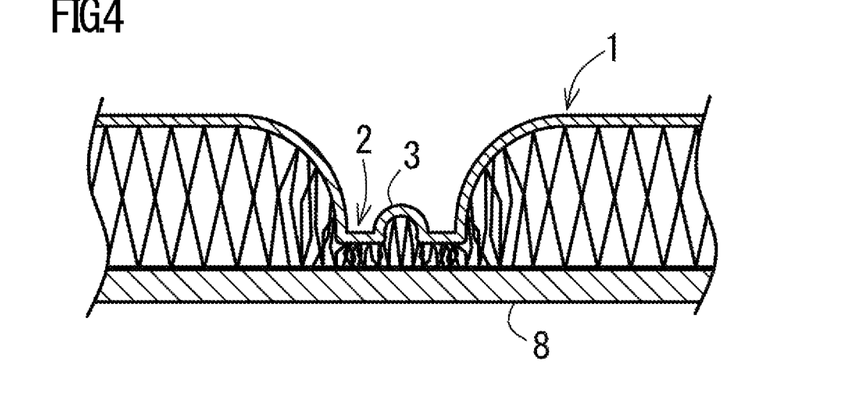
FIG. 4 is an enlarged cross-sectional view taken along line IV-IV of FIG. 3.

The application or the like of the skin material (1, 31) is not particularly limited. This skin material may be used as a skin material constituting vehicle interior materials such as door trims, roof trims, seats, dashboards, pillar garnishes, console boxes, armrests and deck side trims, or may be used as a skin material constituting daily necessities such as furniture including sofas, bags, wallets and clothes. Further, this skin material can be used as a structure bonded by adhesion, heat fusion or the like on a base material made of, for example, a synthetic resin, a metal or wood, for example, as shown in FIG. 4. One or more other functional layers such as a sound absorbing layer and an elastic layer may be interposed between the skin material and the base material.

Method for Producing Skin Material

Figure 5A:
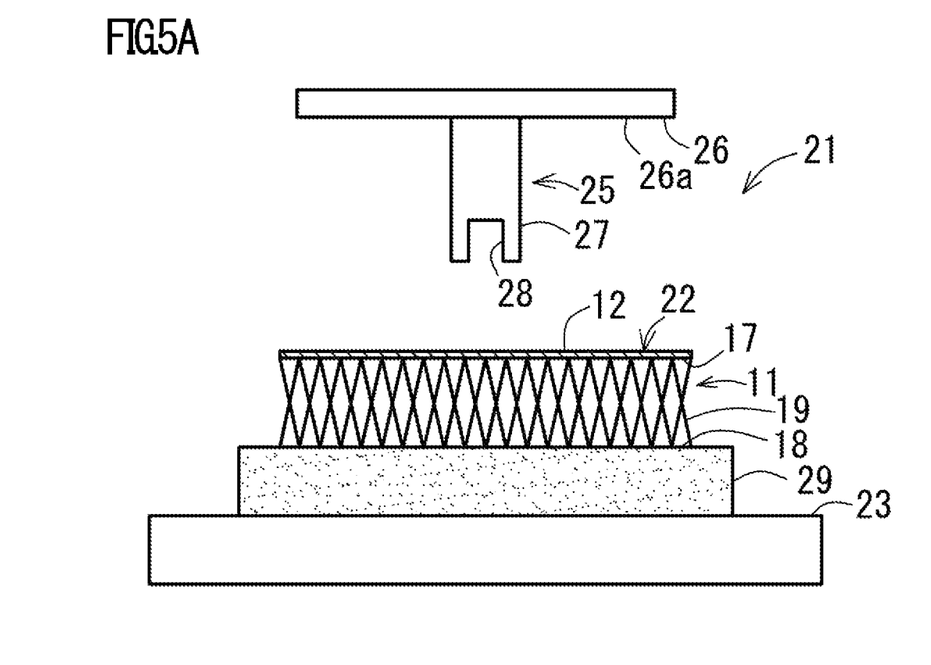
Figure 5B:
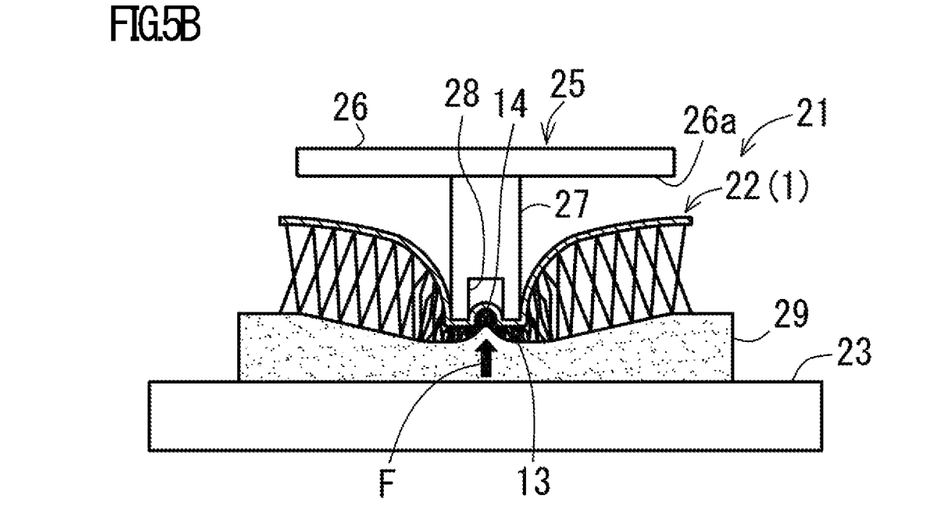
Figure 6:
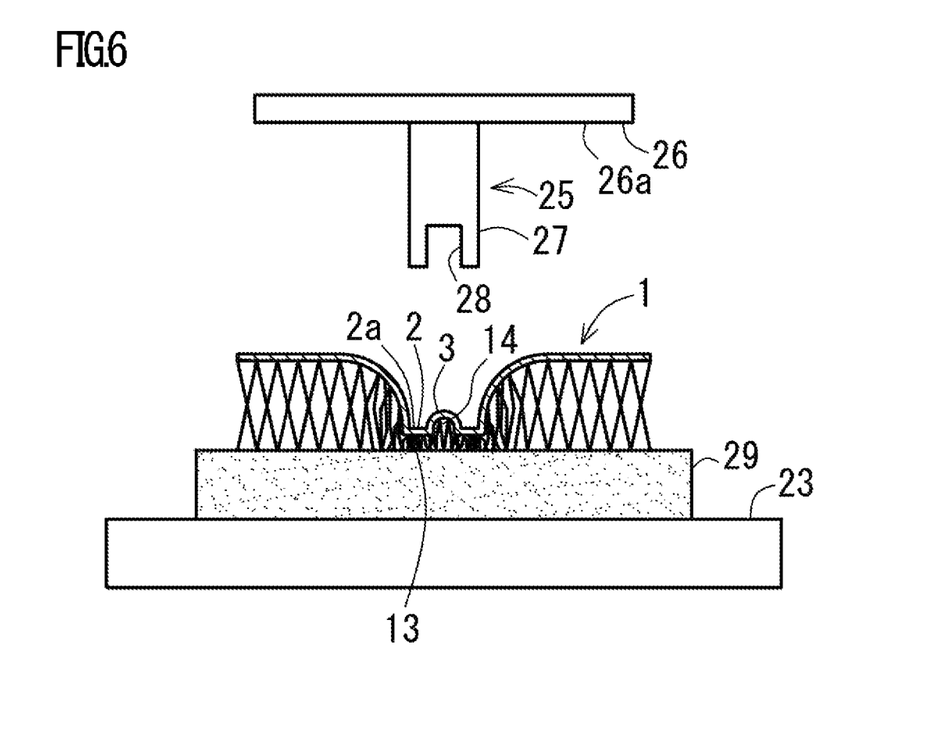
FIG. 6 is an explanatory view for explaining the method for producing the skin material, which shows a die open state after embossing.

The method for producing a skin material according to the present embodiment is a method for producing a skin material (1, 31) having a concave part (2, 32) formed on the front surface side, for example, as shown in FIGS. 5 and 6, comprising heat-pressing a raw material (22) between an embossing die (25, 35) and an elastic sheet (29) to form the concave part (2, 32), and, at the same time, forming a convex part (3, 33, 43) on a bottom surface (2a, 32a) of the concave part. The method for producing a skin material can be, for example, a method for producing the skin material (1, 31) according to the above-described embodiment.

The configuration of the embossing die (25, 35), the form of the heat-pressing, and the like are not particularly limited. In the embossing die, a pressing rib (27, 37) can be protrudingly provided on a surface thereof, and the pressing rib can be formed with a gap part (28, 38) that opens at its tip end surface, for example, as shown in FIG. 5. In this case, for example, during the heat-pressing, the pressing rib (27, 37) presses the front surface side of a part of the raw material, thereby making it possible to form the concave part (2, 32), and, at the same time, a part of the raw material is pushed out into the gap part (28, 38) by repulsive force (F) of the elastic sheet (29) due to the pressing of the pressing rib, thereby making it possible to form the convex part (3, 33, 43). Further, the heat-pressing can be performed, for example, in a state where the surface (26a, 36a) of the embossing die (25, 35) on which the pressing rib (27, 37) is protrudingly provided is spaced apart from the front surface of the raw material (22).

The material, hardness, thickness, etc. of the elastic sheet (29) are not particularly limited. Examples of the material for this elastic sheet include rubbers such as natural rubber, synthetic natural rubber, styrene butadiene rubber, butadiene rubber, chloroprene rubber, butyl rubber, nitrile rubber, ethylene/propylene rubber, chlorosulfonated polyethylene rubber, acrylic rubber, urethane rubber, silicone rubber, fluororubber and polysulfide rubber, and thermoplastic elastomers. Among these, silicone rubber, fluororubber, or acrylic rubber is preferable from the viewpoint of impact resilience and heat resistance. Further, examples of the hardness of the elastic sheet (29) in accordance with JIS K 6253 include E10 to D100 (preferably, A10 to A90). If the hardness is within the above range, more appropriate pressing force is applied to the raw material during the heat-pressing. In addition, the alphabet attached to the head of the hardness value shows a value measured with a durometer of type E, type D or type A. Further, the thickness of the elastic sheet (29) may be, for example, 0.5 to 15 mm (preferably, 2 to 8 mm). If this thickness is within the above range, further appropriate pressing force is applied to the raw material during the heat-pressing.

The configuration, material, size and the like of the raw material (22) are not particularly limited. This raw material can include a base cloth layer (11) containing at least thermoplastic resin fibers and made of a knit, and a skin layer (12) bonded to a surface of the base cloth layer, for example, as shown in FIG. 5. In this case, for example, the thermoplastic resin fibers are thermally deformed during the heat-pressing so that the concave heat-deformed part (13) including the bulging part (14) can be formed in the base cloth layer (11), and the skin layer (12) follows the surface shape of the heat-deformed part (13), thereby making it possible to form the concave part (2, 32) and the convex part (3, 33, 43). In addition, the configurations described in connection with the skin material (1, 31) according to the above-described embodiment can be employed as those of the base cloth layer (11) and the skin layer (12).

Note that reference signs in parentheses attached to the respective components described in the above embodiments indicate correspondence relationships with specific components referred to in the Examples that will be described later.

EXAMPLES

Hereinafter, the present invention will be described in detail by way of examples with reference to the accompanying drawings.

Example 1

(1) Configuration of Skin Material

A skin material 1 according to the present example, has a concave part 2 formed (shaped) on the front surface side, and a convex part 3 formed (shaped) on a bottom surface 2a of the concave part 2, as shown in FIGS. 1 and 2. This skin material 1 is formed in a flexible sheet shape. Further, the bottom surface of the skin material 1 is formed in a flat shape without unevenness.

The concave part 2 is formed to extend linearly in a plan view. Further, in a longitudinal cross section along the short length direction of the concave part 2, both side surfaces 6 rising from both side edges of the bottom surface 2a are formed in a curved shape so as to go away from each other toward the opening side of the concave part 2. The concave part 2 has a depth d of about 3 mm and a width w2 in the short length direction of about 5 mm.

The convex part 3 is formed to extend linearly in a plan view. The convex part 3 is formed in a mountain shape (i.e., a bulging shape) in a vertical cross section along the short length direction. The convex part 3 has a height h of about 1 mm and a width w1 in the short length direction of about 2 mm.

Figure 3:
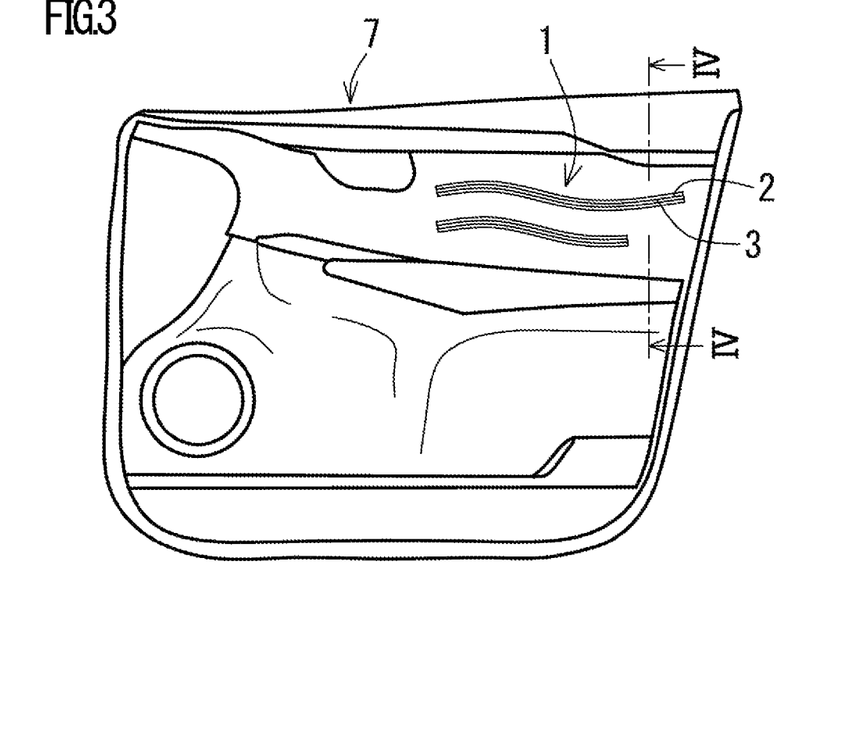
FIG. 3 is a plan view of a door trim provided with the skin material.

As shown in FIGS. 3 and 4, the skin material 1 is used by being bonded, for example, to a door ornament (base material) 8 constituting a door trim 7 for an automobile by adhesion, heat fusion or the like.

The skin material 1 includes a base cloth layer 11 containing at least thermoplastic resin fibers and made of a knit, and a skin layer 12 bonded to a surface of the base cloth layer 11 by adhesion, heat fusion or the like. In the base cloth layer 11, a concave heat-deformed part 13 in which the thermoplastic resin fibers are thermally deformed is formed at a position corresponding to the concave part 2. The heat-deformed part 13 includes a bulging part 14 at a position corresponding to the convex part 3. The bulging part 14 bulges on a surface of the heat-deformed part 13. The concave part 2 and the convex part 3 are formed by the skin layer 12 following the surface shape of the heat-deformed part 13 including the bulging part 14.

The base cloth layer 11 has a thickness, at a site other than the heat-deformed part 13, of about 4 mm. The skin layer 12 has a thickness of about 0.4 mm. Also, the knit is a three-dimensional knitted fabric obtained using a double raschel knitting machine (or circular knitting machine). This three-dimensional knitted fabric is formed in such a manner that a front side knitted fabric 17 and a back side knitted fabric 18 are connected by a binding yarn 19. The binding yarn 19 falls down so that the thickness of the base cloth layer 11 becomes small, whereby the heat-deformed part 13 is formed. Moreover, the constituent yarns of the front side knitted fabric 17 are polyester resin fibers, and the thickness thereof is about 0.4 mm. Moreover, the constituent yarns of the back side knitted fabric 18 are polyester resin fibers, and the thickness thereof is about 0.4 mm. Furthermore, the binding yarn 19 is a polyester resin fiber.

(2) Method for Producing Skin Material

In a method for producing the skin material according to the present example, as shown in FIGS. 5 and 6, a raw material 22 is heat-pressed using an embossing machine 21 to obtain the skin material 1.

The raw material 22 includes the base cloth layer 11 containing at least thermoplastic resin fibers and made of a knit, and the skin layer 12 bonded to a surface of the base cloth layer 11. This raw material 22 is formed in a sheet shape without unevenness.

The embossing machine 21 includes a pedestal 23 (also referred to as a "surface plate"), and an embossing die 25 that can be moved closer to or away from the pedestal 23. The pedestal 23 and the embossing die 25 can be heated by a heating means (not shown).

Figure 7:
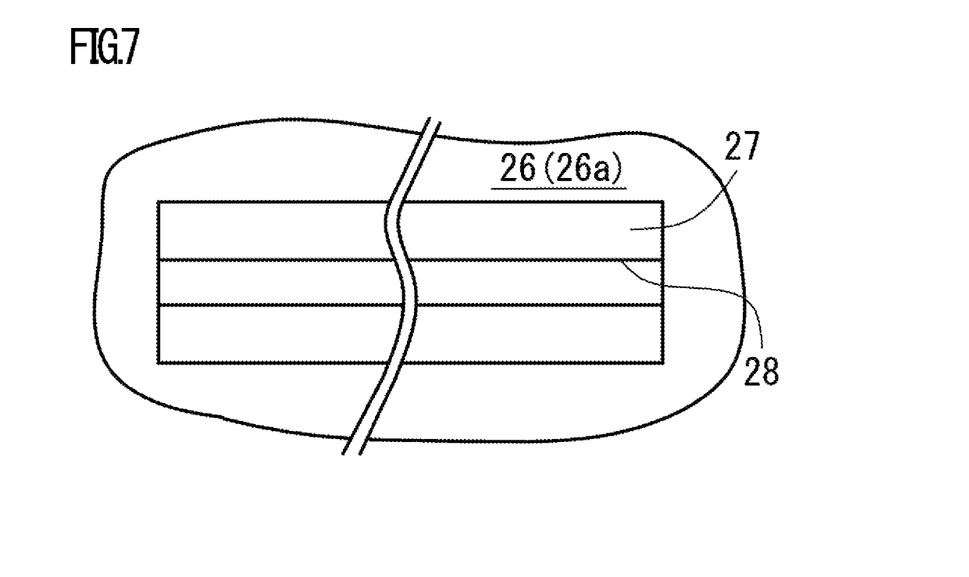
FIG. 7 is a plan view of an embossing die used in the method for producing the skin material.

The embossing die 25 includes a support part 26 and a pressing rib 27 protrudingly provided on a surface of the support part 26. The pressing rib 27 is formed with a gap part 28 that opens at its tip end surface (see FIG. 7). An elastic sheet 29 made of silicone rubber is laid on the upper surface of the pedestal 23. The elastic sheet 29 has such hardness and thickness that an appropriate repulsive force F is applied to the raw material 22 during the heat-pressing.

In the method for producing the skin material, as shown in FIG. 5A, the raw material 22 is placed (set) on the elastic sheet 29 of the embossing machine 21 in a die open state so that the base cloth layer 11 is in contact with the elastic sheet 29. When the embossing machine 21 is die-closed from that state, the raw material 22 is heat-pressed between the embossing die 25 and the elastic sheet 29, as shown in FIG. 5B, so that the concave part 2 is formed, and, at the same time, the convex part 3 is formed on the bottom surface 2a of the concave part 2.

During the heat-pressing, the pressing rib 27 presses the front surface side of a part of the raw material 22 in a state where the surface 26a of the embossing die 25 on which the pressing rib 27 is protrudingly provided and the bottom surface of the gap part 28 are spaced apart from the front surface of the raw material 22, thereby forming the concave part 2, and, at the same time, a part of the raw material 22 is pushed up into the gap part 28 by the repulsive force F of the elastic sheet 29 due to the pressing of the pressing rib 27, thereby forming the convex part 3. Specifically, the thermoplastic resin fibers are thermally deformed by the pressing of the pressing rib 27, so that the concave heat-deformed part 13 including the bulging part 14 is formed in the base cloth layer 11, and the skin layer 12 follows the surface shape of the heat-deformed part 13 including the bulging part 14, thereby forming the concave part 2 and the convex part 3. The heat-deformed part 13 is formed by the binding yarn 19 falling down so that the thickness of the base cloth layer 11 becomes small.

Thereafter, when the embossing machine 21 is brought into a die open state, as shown in FIG. 6, the skin material 1 in which the convex part 3 is formed on the bottom surface 2a of the concave part 2 is obtained.

In the present example, the heat-pressing is performed under the conditions: a heating time of about 20 seconds, a pedestal temperature of about 200° C., and an embossing die temperature of about 150° C.

(3) Effects of Example

According to the method for producing the skin material of the present example, the raw material 22 is heat-pressed between the embossing die 25 and the elastic sheet 29 to form the concave part 2, and, at the same time, the convex part 3 is formed on the bottom surface 2a of the concave part 2. Thus, the elongated line-shaped convex part 3 is clearly expressed on the bottom surface 2a of the concave part 2. Therefore, the degree of freedom of design expression in the skin material 1 can be increased.

In the present example, the pressing rib 27 is protrudingly provided on the surface 26a of the embossing die 25, and the pressing rib 27 is formed with the gap part 28. During the heat-pressing, the pressing rib 27 presses the front surface side of a part of the raw material 22 to form the concave part 2, and, at the same time, a part of the raw material 22 is pushed out into the gap part 28 by the repulsive force F of the elastic sheet 29 due to the pressing of the pressing rib 27, thereby forming the convex part 3. Thus, the elongated line-shaped convex part 3 is more clearly expressed.

Further, in the present example, the heat-pressing is performed in a state where the surface 26a of the embossing die 25 on which the pressing rib 27 is protrudingly provided is spaced apart from the front surface of the raw material 22. Thus, thermal deterioration of the front surface of the skin material 1 is suppressed.

Further, in the present example, the elastic sheet 29 is formed of silicone rubber. Therefore, a part of the raw material 22 is effectively pushed out into the gap part 28 by the appropriate repulsive force F of the elastic sheet 29.

According to the skin material 1 of the present example, the convex part 3 is formed on the bottom surface 2a of the concave part 2. Thus, the elongated line-shaped convex part 3 is clearly expressed on the bottom surface 2a of the concave part 2. Therefore, the degree of freedom of design expression in the skin material 1 can be increased.

Further, in the present example, the convex part 3 is formed to extend linearly in a plan view. Thus, the elongated line-shaped convex part 3 is clearly expressed. Further, in the present example, the concave part 2 is formed to extend linearly in a plan view. Thus, the elongated line-shaped convex part 3 is clearly expressed along the bottom surface 2a of the linear concave part 2. Further, in the present example, the width w1 of the convex part 3 is about 2 mm Thus, the more elongated line-shaped convex part 3 is clearly expressed.

Further, in the present example, the skin material 1 includes the base cloth layer 11 and the skin layer 12, and, in the base cloth layer 11, the concave heat-deformed part 13 in which the thermoplastic resin fibers are thermally deformed is formed at a position corresponding to the concave part 2. The heat-deformed part 13 includes the bulging part 14 at a position corresponding to the convex part 3, and the skin layer 12 follows the surface shape of the heat-deformed part 13. Thus, the elongated line-shaped convex part 3 can be more clearly expressed, and the skin material 1 can have appropriate cushioning properties.

Further, in the present example, the bottom surface of the skin material 1 is formed in a flat shape without unevenness. Thus, the skin material 1 can be easily and reliably bonded to the door ornament 8.

Example 2

Next, a skin material 31 and a method for producing the same according to Example 2 will be described. Approximately the same components as in the skin material 1 and the method for producing the same according to Example 1 are denoted by the same reference signs and detailed description thereof is omitted. Differences between the Examples will be described in detail.

(1) Configuration of Skin Material

Figure 9:
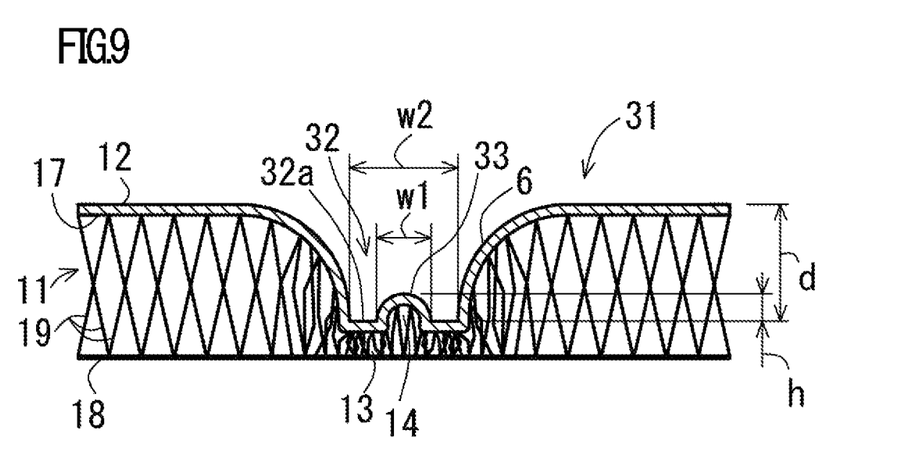
FIG. 9 is an enlarged cross-sectional view taken along line IX-IX of FIG. 8.

The skin material 31 according to the present example has a concave part 32 formed (shaped) on the front surface side, and convex parts 33 formed (shaped) on a bottom surface 32a of the concave part 32, as shown in FIGS. 8 and 9. This skin material 31 is formed in a flexible sheet shape. Further, the bottom surface of the skin material 31 is formed in a flat shape without unevenness.

The concave part 32 is formed to extend linearly in a plan view. A plurality of the convex parts 33 is formed to be arranged in a line in a plan view. Each of these convex parts 33 is formed in a long shape in a plan view. Further, each of the convex parts 33 is formed in a mountain shape (i.e., a bulging shape) in a vertical cross section orthogonal to the long length direction. Further, each of the convex parts 33 has a height h of about 1 mm and a width w1 in the short length direction of about 2 mm (2) Method for Producing Skin Material In a method for producing the skin material according to the present example, a raw material 22 is heat-pressed using an embossing machine 21 to obtain the skin material 31 (see FIGS. 5 and 6). In the embossing machine 21, an embossing die 35 is employed instead of the embossing die 25.

Figure 10:
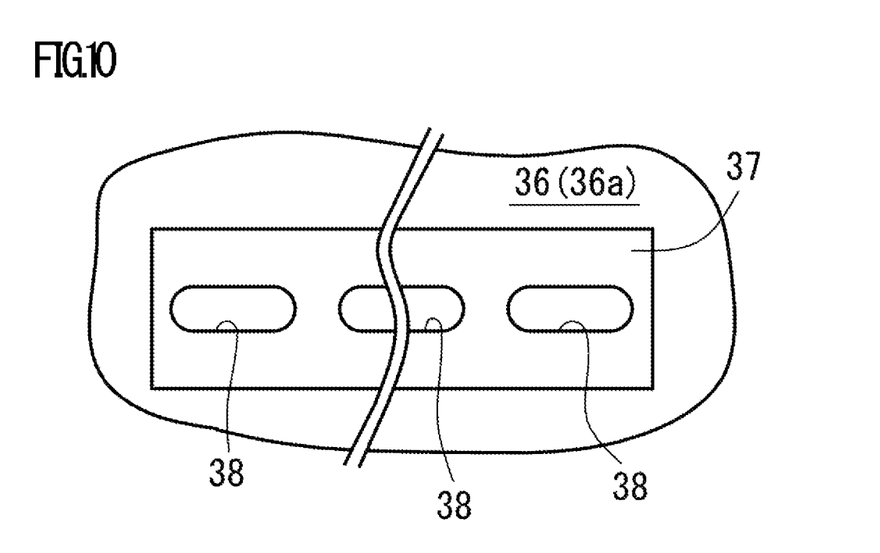
FIG. 10 is a plan view of an embossing die used in a method for producing the skin material.

As shown in FIG. 10, the embossing die 35 includes a support part 36 and a pressing rib 37 protrudingly provided on a surface of the support part 36. The pressing rib 37 is formed with a plurality of gap parts 38 that open at the tip end surface thereof.

During the heat-pressing, the pressing rib 37 presses the front surface side of a part of the raw material 22 in a state where the surface 35a of the embossing die 35 on which the pressing rib 37 is protrudingly provided and the bottom surface of each of the gap parts 38 are spaced apart from the front surface of the raw material 22, thereby forming the concave part 32, and, at the same time, a part of the raw material 22 is pushed up into each of the gap parts 38 by the repulsive force F of the elastic sheet 29 due to the pressing of the pressing rib 37, thereby forming each of the convex parts 33.

(3) Effects of Example

According to the skin material 31 and the method for producing the same according to the present example, approximately the same actions/effects as those of the skin material 1 and the method for producing the same according to the above-described example can be obtained. Additionally, the plurality of convex parts 33 are formed to be arranged in a line in a plan view, and thus the elongated dotted line-shaped convex part 33 is clearly expressed. Therefore, the degree of freedom of design expression in the skin material 31 can be increased.

Figure 11A:
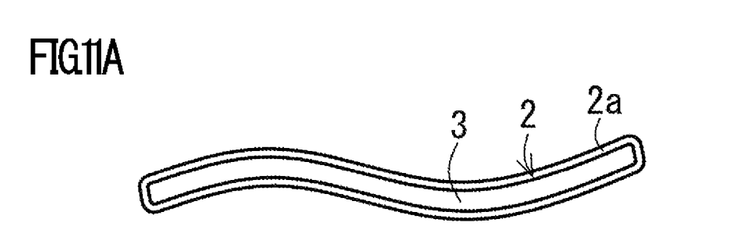

The present invention is not limited to the above-described examples, and can be variously modified within the scope of the present invention depending on the purpose and use. Specifically, in the above-described examples, the convex part 3 and the concave part 2 extending in a straight line have been exemplified, but the present invention is not limited thereto. For example, as shown in FIG. 11A, a convex part 3 and a concave part 2 extending in a curve may be employed.

Figure 11B:
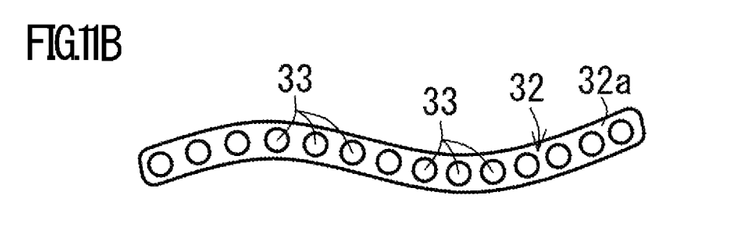

Further, in the above-described examples, the plurality of convex parts 33 arranged in a straight line has been exemplified, but the invention is not limited thereto. For example, as shown in FIG. 11B, a plurality of convex parts 33 arranged in a curve may be employed. Further, for example, as shown in FIG. 12, a plurality of dot-shaped convex parts 43 arranged at random or according to a predetermined rule may be employed.

Further, in the above-described examples, one convex part 3 and one concave part 2 extending linearly have been exemplified, but the present invention is not limited thereto.

Figure 11C:
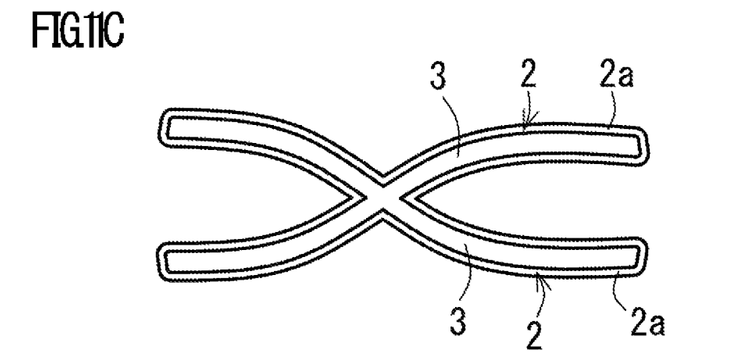

For example, as shown in FIGS. 11C and 12, two or more convex parts 3 and concave parts 2 extending linearly and intersecting may be employed.

Moreover, the skin materials 1 and 31 and raw material 22 each which include the base cloth layer 11 made of a knit have been exemplified in the above-described examples, but the present invention is not limited thereto, For example, the skin materials 1 and 31 and raw material 22 may each include a base cloth layer 11 made of a fabric such as a textile or a nonwoven fabric, a foam sheet or the like.

Moreover, in the above-described examples, the heating temperature, time, etc. of heat-pressing are suitably selected according to the material for the raw material and the like. The heating temperature can be, for example, 100 to 200° C. (particularly 120 to 180° C.). The heating time may be different or identical between on the front surface side and on the back surface side of the raw material. The heating time can be set to, for example, 0.1 to 600 seconds.

Further, in the above-described examples, the forms in which the concave gap part 28, 38 is formed on the tip end side of the pressing rib 27, 37 have been exemplified, but the present invention is not limited thereto. A form in which a gap part is formed over a range from the proximal end to the tip end of the pressing rib 27, 37 may be employed.

Further, in the above-described examples, the heat-pressing performed in a state where the surface 26a, 36a of the embossing die 25, 35 is spaced apart from the front surface of the raw material 22 has been exemplified, but the present invention is not limited thereto. Heat-pressing performed in a state where the surface 26a, 36a of the embossing die 25, 35 is in contact with the front surface of the raw material 22 may be employed.

Further, in the above-described examples, the forms in which the embossing die 25, 35 and the pedestal 23 are moved closer to or away from each other to heat-press the raw material 22 have been exemplified, but the present invention is not limited thereto. For example, the raw material 22 may be heat-pressed by rotating a roll-shaped embossing die.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

The present invention is widely used in the field related to skin materials in various industries such as vehicles (automobiles and railway vehicles), aircraft, ships, buildings, furniture and apparel.

What is claimed is:

1. A method for producing a skin material having a concave part formed on a front surface side, comprising:
   heat-pressing a raw material between an embossing die and a supported elastic sheet to form the skin material having the concave part;
   at the same time, forming a convex part within the concave part on a bottom surface thereof, wherein a height of the convex part is smaller than a depth of the concave part;
   wherein a pressing rib is protrudingly provided on a surface of the embossing die,
   wherein the pressing rib is formed with a gap part that opens at a tip end surface of the pressing rib,
   wherein a depth of the gap part from the tip end surface of the pressing rib is smaller than a height of the pressing rib from the surface of the embossing die, and
   wherein, during the heat-pressing, the pressing rib presses a front surface side of a part of the raw material to form the concave part, and, at the same time, another part of the raw material is pushed out into the gap part by the repulsive force of the supported elastic sheet due to the pressing of the pressing rib to form the convex part within the concave part, wherein a bottom surface of the gap part is spaced apart from the front surface of the raw material.

2. The method for producing a skin material according to claim 1, wherein the heat-pressing is performed in a state where the surface of the embossing die on which the pressing rib is protrudingly provided is also spaced apart from the front surface of the raw material.

3. The method for producing a skin material according to claim 1, further comprising:
   the convex part having a maximum width at the bottom surface of the concave part and the height of the convex part being measured from the bottom surface of the concave part to a top surface portion of the convex part, and wherein
   a ratio of the height of the convex part with respect to the maximum width of the convex part is from 0.1 to 2.0.

4. The method for producing a skin material according to claim 3, wherein the ratio of the height of the convex part with respect to the maximum width of the convex part is from 0.2 to 1.0.

5. The method for producing a skin material according to claim 1, wherein
   the raw material includes a surface skin layer and a base cloth layer; and
   at least a portion of the base cloth layer contains thermoplastic resin fibers that are thermally deformed to form a heat deformed part comprising a concave portion corresponding to the concave part and a bulging portion corresponding to the convex part due to the surface skin layer following the shape of the heat deformed part.

6. The method for producing a skin material according to claim 1, wherein the supported elastic sheet comprises a pedestal having the elastic sheet on an upper surface thereof, wherein during the heat-pressing, the embossing die moves closer to the pedestal.

7. The method for producing a skin material according to claim 1, wherein the embossing die is a roll-shaped embossing die, wherein during the heat-pressing, the roll-shaped embossing die rotates.

8. The method for producing a skin material according to claim 5, wherein the base cloth containing thermoplastic resin fibers is made from a knit.

9. The method for producing a skin material according to claim 8, wherein the knit is a three-dimensional knitted fabric comprising a front-side knitted fabric having the surface skin layer located thereon and a back-side knitted fabric connected by a binding yarn, wherein the thermoplastic resin fibers are used for the binding yarn.

10. The method for producing a skin material according to claim 9, wherein the thermally deformed thermoplastic resin fibers comprise the binding yarn falling down in the concave part and the convex part.

11. The method for producing a skin material according to claim 5, wherein the surface skin layer is a design cloth/fabric, a resin layer, synthetic leather, artificial leather, and/or natural leather in a single layer or a layer in which a plurality of layers are laminated.

12. The method for producing a skin material according to claim 1, wherein the concave part and the convex part extend linearly in plan view.

13. The method for producing a skin material according to claim 1, wherein the convex part comprises a plurality of convex parts arranged within the concave part and spaced apart in plan view.

14. The method for producing a skin material according to claim 13, the concave part extends linearly in plan view and the plurality of convex parts are arranged spaced apart in a line and/or curve therein.

15. The method for producing a skin material according to claim 1, wherein two or more concave parts are formed, each concave part having a corresponding convex part.

16. The method for producing a skin material according to claim 15, wherein the two or more concave parts and corresponding convex parts extend linearly in plan view and optionally intersect each other.

17. The method for producing a skin material according to claim 1, wherein the hardness of the supported elastic sheet in accordance with JIS K 6253 comprises E10 to D100.

18. The method for producing a skin material according to claim 1, wherein the hardness of the supported elastic sheet in accordance with JIS K 6253 comprises A10 to A90.

19. The method for producing a skin material according to claim 1, wherein the depth of the gap part is smaller than the depth of the concave part.

20. The method for producing a skin material according to claim 6, wherein the heat-pressing is performed with a heating time of about 20 seconds, a pedestal temperature of about 200° C., and an embossing die temperature of a bout 150° C.

21. A method for producing a door trim for an automobile comprising the method for producing a skin material according to claim 1 which further comprises bonding the skin material to a door ornament.

* * * * *